March 23, 1954     A. C. MILLER     2,672,965
ELECTROMAGNETIC CLUTCH
Filed May 16, 1949
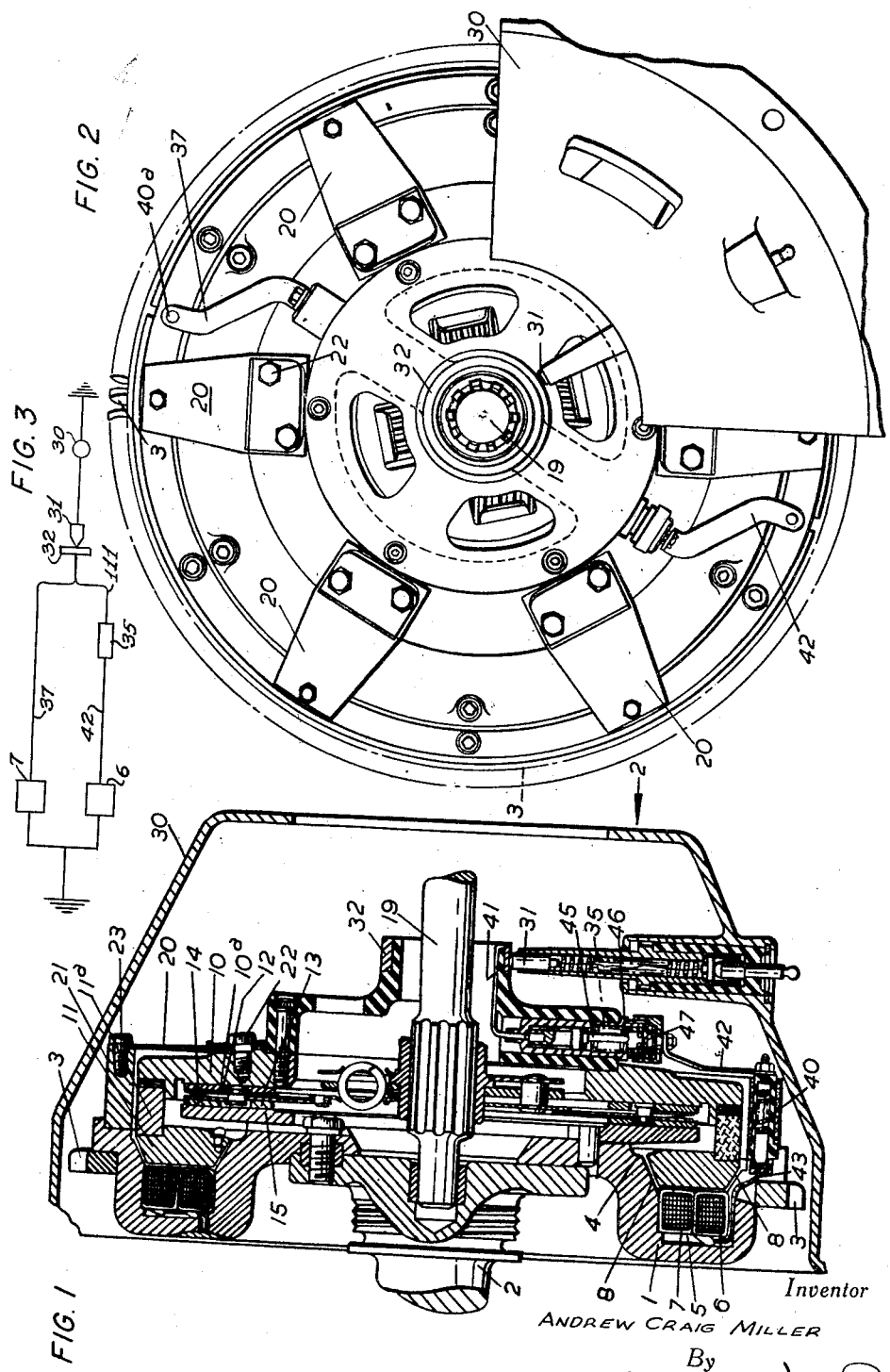
Inventor
ANDREW CRAIG MILLER
By Wilkinson, Mawhinney
Attorneys Patented Mar. 23, 1954

2,672,965

UNITED STATES PATENT OFFICE 2,672,965

ELECTROMAGNETIC CLUTCH

Andrew Craig Miller, Stoke, Coventry, England, assignor to Humber Limited, Stoke, Coventry, England, a British company Application May 16, 1949, Serial No. 93,554

Claims priority, application Great Britain May 21, 1948

1 Claim. (Cl. 192—103)

The invention relates to electro-magnetic clutches (e. g. for motor vehicles) of the kind comprising driving and driven rotatable members and an electrical solenoid arranged on energization to effect engagement of the clutch by bringing the two members into frictional or magnetic torque-transmitting relation.

It has been found that with clutches of the above kind as at present constructed it is difficult to obtain, on energization of the coil or solenoid, the degree of slip between the two members necessary to ensure smooth take-up of the drive when the torque to be transmitted on engagement is substantially less than the maximum torque for which the clutch is designed. For instance in a vehicle having a high power/weight ratio if the clutch is designed to be able to transmit the maximum torque that the engine can deliver it is found that the clutch is "fierce" and difficulty is experienced in engaging the clutch gently, as is required to "inch" the vehicle when parking and driving in dense traffic or to hold the vehicle on a very slight gradient. It is an object of the invention to provide an improved clutch of the kind described which overcomes or reduces this difficulty.

The invention provides an electro-magnetic clutch of the kind described in which the solenoid is constructed in two parts, the energization of one of which parts may be controlled or effected separately from the other thereby providing means by which the torque transmitting capacity of the clutch may be increased after the clutch has been engaged. This arrangement has the advantage that the torque handling capacity of the clutch on engagement may be comparatively low enabling the slip between the members necessary for smooth engagement to take place and the capacity may subsequently be increased to enable the clutch to transmit with little or no slip the full torque desired.

The clutch includes a switch in the supply circuit to one solenoid part and means for automatically closing the switch to energize the part when the speed of one of the clutch members (preferably the driving member) exceeds a predetermined value. Preferably the two solenoid parts comprise two concentric annular coils wound in either direction and arranged for connection in parallel.

In one construction of the clutch according to the invention the solenoid comprises two concentric annular coils one of which coils is arranged to be energized on closing of a clutch control switch and on being energized to engage the clutch to provide a limited torque transmitting capacity, and there is a centrifugal switch for automatically connecting the other coil in parallel with the first said coil when the speed of the driving member exceeds a predetermined value, so as to provide above that speed value an increased torque transmitting capacity. The two parts of the solenoid may have different current consumptions and have the same or a different number of turns. Preferably the centrifugal switch is arranged to be driven by, or in synchronism with, the driving friction member or shaft and employed to complete the circuit of the second of the solenoids to be energized, when the speed of the driving shaft exceeds the said predetermined value.

The invention may be applied for example to the magnetic clutches described in British patent specifications Nos. 594,906 and 597,193.

A specific construction of an electro-magnetic clutch incorproating the invention will now be described by way of example and with reference to the accompanying drawings in which:

Figure 1 is a section through the clutch, and

Figure 2 a view in the direction of the arrow in Figure 1 showing the clutch with the cover partly cut away.

Figure 3 is a schematic view showing the circuit to the coils.

The clutch forming the subject of this example is intended for use in transmitting the drive from the engine to the gear box and thence to the road wheels of a motor vehicle. One of the clutch engaging members comprises the fly-wheel 1 of the engine and is secured to the engine shaft 2. A starter gear ring 3 of normal construction is attached to the circumference of the fly-wheel. One face of the fly-wheel—i. e. the face 4 remote from the engine—has an annular groove cut in its face and recessed into the base of the groove are the magnet coils 6, 7. The sides 8 of the groove outside the magnet coils are so tapered that the mouth of the groove is wider than the base.

The other clutch engaging member consists of an annular pressure plate 10 having secured on one face a ring 11 constituting the armature of the electromagnets and fitting into the aforesaid groove in the face of the fly-wheel. The ring 11 is secured to the plate 10 by an annulus 11a of non-magnetic material. On the face of the pressure plate adjacent to the fly-wheel there is formed a clutch surface 10a arranged to make clutching engagement with a frictional lining 12 on one face of a clutch plate 13 splined to the driven shaft 19 of the clutch, the driven shaft being in constant driving engagement with the gear box. The other face of the clutch plate 13, which also has a frictional lining 14 is arranged to make driving engagement with a ring 15 secured to the adjacent face of the fly-wheel.

Flexible strips 20 of spring steel extend radially between the outer face of the pressure plate 10 and a peripheral flange 21 of non-magnetic material on the flywheel. The strips are attached by screws 22, 23 both to the pressure plate and to the fly-wheel flange and are arranged to transmit the torque between the two parts. The pressure plate 10 is received substantially wholly within the flange 21 on the fly-wheel which also surrounds the clutch plate 13. The strips 20 are slightly biassed to tend to disengage the clutch.

The solenoid consists of two separate coils 6, 7. Each coil is rectangular in section and the two coils have equal numbers of turns and are wound in the same direction. One coil 6, is wound around the outer periphery of the other, 7, and the two coils fit within the annular groove in the face of the fly-wheel.

A casing 30 surrounds the clutch and electrical connection is made to the coils by means of a brush 31 (or two diametrically opposed brushes) supported on the casing and making connection with a single insulated slip ring 32 secured to the pressure plate 10. The inner coil 7 is electrically connected directly between the slip ring 32 and the fly-wheel which is electrically connected to the frame of the vehicle via the driving shaft. The outer coil 6 is connected to the slip-ring through a centrifugal switch 35 mounted on the outer face of the pressure plate and the circuit is completed through the fly-wheel.

The connection from the slip-ring to the inner coil comprises a lead, not shown, from the slip-ring to a flexible strip 37 extending between the pressure plate and the flange 21 and a resilient connection 40a, as described in British specification No. 610,594 and similar to that shown at 40. The connection from the slip-ring to the outer coil comprises a lead 41 from the slip-ring to the centrifugal switch 35, a flexible strip 42 and the connection 40 with lead 43. The centrifugal switch comprises a plunger 45 movable under centrifugal action against a spring 46 to make contact with a button 47.

The method of operation is as follows: The desired gear is engaged and the clutch operating voltage is applied to the slip-ring by any convenient means (such as the variable output of an engine-driven generator 50 as described in our British specification No. 610,519) or from the car battery with or without a series resistance. The inner coil is thereby energized and the clutch is then able to transmit a limited torque, sufficient to "creep" the vehicle or to hold it on a slight gradient as the accelerator pedal is gently depressed or held. When the engine is speeded up the centrifugal switch operates when a predetermined speed is reached and closes the supply circuit to energize the outer coil. The clutch can then transmit the full engine torque.

It will be appreciated that by suitable design of the coils the clutch may be arranged so that when engaged by energization of only one of the coils, it may have any desired percentage of its full torque transmitting capacity. As an example of the application of this feature of the invention the following figures give an indication of the required percentage of the available engine torque (at 600 R. P. M.) which are required to maintain a typical modern high performance car having a rolling resistance of 38 lbs. per ton in motion on the level, at the speeds indicated and with the indicated gears engaged.

| Gear | Percent Torque | Actual speed, M. P. H. |
|---|---|---|
| 1 | 4 | 3.5 |
| 2 | 6 | 6.0 |
| 3 | 10 | 10.0 |
| 4 | 17 | 15.0 |

It will also be appreciated that by the employment of two coils a large range in torque transmitting capacity may be obtained without an inconveniently large range of current consumption, since the torque transmitting capacity of the clutch is proportional to the square of the ampere turns of the energized coil. Two similar coils will therefore, when both energized, give four times the torque transmitting capacity which is given by the energization of only one of the coils, but the current consumption will only be doubled.

For example, consider a clutch having an effective radius, $r$, of 6 inches and a friction material having a co-efficient of friction, $\mu$, of 0.25. Then the axial pull, P, required to transmit a torque T is given by:

$$P = \frac{T}{2\mu r} = 4T$$

The flux density in kilogauss B, required to produce the axial pull P when the area of the magnetic gap is A sq. cms. is given by the formula:

$$B^2 = \frac{11.18P}{A}$$

In this example $A = 200$ sq. cms. and therefore in order to transmit a torque of 100 lbs. feet:

$$B^2 = \frac{11.18 \times 4 \times 100}{200}$$

and therefore $B = 4.73$ kilogauss.

The ampere-turns, $At$, required to produce this flux density are given by:

$At = 2Bd$, where $d$ is the magnetic gap and B is expressed in gauss $d$ in this example is 0.020″
therefore $At = 2 \times 4730 \times .020 = 189.2$ ampere turns.

Similarly in order to produce a torque transmitting capacity of 400 lbs. feet (i. e., four times that referred to above):

$$B^2 = \frac{11.18 \times 4 \times 400}{200}$$

therefore $B = 9.46$ kilogauss
and $At = 2 \times 9460 \times .020 = 378.4$ ampere turns—that is twice the ampere turns needed to produce 100 lbs. feet torque capacity.

I claim:

An electro-magnetic friction clutch for use with an internal combustion engine having a driving shaft which clutch comprises a rotatable flywheel for attachment to the engine shaft and having a groove in one side face concentric with the shaft, two annular coils secured within the groove at the bottom thereof, a rotatable driven shaft coaxial with the axis of rotation of the flywheel, a pressure plate arranged for rotation about the driven shaft and for limited movement towards and away from the said face of the flywheel, an annular armature secured to the pressure plate and received within the aforesaid groove for attraction by the coils when energized, a friction clutch plate between the adjacent face of the pressure plate and the flywheel and arranged for rotation with the driven shaft and to be clamped between the pressure plate and the flywheel when the armature is attracted, an electrical slip-ring rotatable with the pressure plate, electrical connections from the slip-ring to one of the coils and electrical connections from the slip-ring to the other of the coils including a centrifugal switch arranged to close when the flywheel has reached a predetermined speed of rotation.

ANDREW CRAIG MILLER.

References Cited in the file of this patent

UNITED STATES PATENTS

| Number | Name | Date |
|---|---|---|
| 727,689 | Reist | May 12, 1903 |
| 736,789 | Schuster et al. | Aug. 18, 1903 |
| 859,523 | Rowell | July 9, 1907 |
| 1,219,569 | Libby | Mar. 20, 1917 |
| 1,671,057 | Brainard | May 22, 1928 |
| 1,823,334 | Payne | Sept. 15, 1931 |
| 1,825,934 | Bing | Oct. 6, 1931 |
| 1,978,737 | Bower et al. | Oct. 30, 1934 |
| 2,070,813 | Stearns et al. | Feb. 16, 1937 |
| 2,209,776 | Kiekhaefer | July 30, 1940 |
| 2,214,901 | Griffin | Sept. 17, 1940 |
| 2,375,781 | Gilfillan | May 15, 1945 |
| 2,513,521 | Sampietro et al. | July 4, 1950 |

FOREIGN PATENTS

| Number | Country | Date |
|---|---|---|
| 108,871 | Great Britain | Aug. 17, 1917 |
| 609,979 | Great Britain | Oct. 8, 1948 |
| 936,561 | France | July 23, 1948 |